United States Patent
Kato et al.

(10) Patent No.: US 8,549,750 B2
(45) Date of Patent: Oct. 8, 2013

(54) METHOD OF MANUFACTURING LIQUID DISCHARGE HEAD SUBSTRATE AND METHOD OF PROCESSING THE SUBSTRATE

(75) Inventors: Masataka Kato, Hiratsuka (JP); Keisuke Kishimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/990,093

(22) PCT Filed: Jun. 17, 2009

(86) PCT No.: PCT/JP2009/002758
§ 371 (c)(1),
(2), (4) Date: Oct. 28, 2010

(87) PCT Pub. No.: WO2009/153987
PCT Pub. Date: Dec. 23, 2009

(65) Prior Publication Data
US 2011/0041337 A1 Feb. 24, 2011

(30) Foreign Application Priority Data

Jun. 19, 2008 (JP) .................. 2008-160306

(51) Int. Cl.
| B21D 53/76 | (2006.01) |
| B23P 17/00 | (2006.01) |
| B41J 2/15 | (2006.01) |
| B41J 2/145 | (2006.01) |

(52) U.S. Cl.
USPC ........................................... 29/890.1; 347/40

(58) Field of Classification Search
USPC ................ 29/890.1, 611; 347/20, 40, 44, 45, 347/65; 216/27, 65; 219/121.67
See application file for complete search history.

(56) References Cited

U.S. PATENT DOCUMENTS

| 3,843,865 A | * | 10/1974 | Nath ........................... 219/121.6 |
| 4,550,240 A | * | 10/1985 | Toida et al. ............... 219/121.76 |
| 4,676,242 A | * | 6/1987 | Doi ................................. 606/16 |
| 4,808,260 A | * | 2/1989 | Sickafus et al. ................... 216/2 |
| 4,952,771 A | * | 8/1990 | Wrobel ..................... 219/121.67 |
| 5,498,312 A | * | 3/1996 | Laermer et al. ................ 438/695 |
| 5,501,893 A | * | 3/1996 | Laermer et al. ................ 428/161 |
| 5,608,436 A | * | 3/1997 | Baughman et al. ............. 347/65 |
| 5,658,471 A | * | 8/1997 | Murthy et al. .................. 216/27 |
| 5,767,481 A | * | 6/1998 | Graf ......................... 219/121.67 |

(Continued)

FOREIGN PATENT DOCUMENTS

| CN | 1500636 A | 6/2004 |
| JP | 2004-122173 A | 4/2004 |
| JP | 2007-269016 A | 10/2007 |

OTHER PUBLICATIONS

Chinese Office Action issued in corresponding application No. 200980122055.7 dated Sep. 29, 2012, along with its English-language translation—22 pages.

*Primary Examiner* — David Angwin
(74) *Attorney, Agent, or Firm* — Fitzpatrick, Cella, Harper & Scinto

(57) ABSTRACT

A method of processing a liquid discharge head substrate includes the step of providing a recessed portion in the back surface of the substrate by discharging a manufacturing liquid in a linear trajectory to the back surface of the substrate and by irradiating the back surface of the substrate with laser light that passes along and in the manufacturing liquid.

6 Claims, 4 Drawing Sheets

(56) References Cited

U.S. PATENT DOCUMENTS

| | | | | |
|---|---|---|---|---|
| 5,867,192 | A * | 2/1999 | Mantell et al. | 347/65 |
| 6,143,190 | A * | 11/2000 | Yagi et al. | 216/27 |
| 6,805,432 | B1 * | 10/2004 | Milligan et al. | 347/65 |
| 7,070,700 | B2 * | 7/2006 | Sawaki et al. | 216/27 |
| 8,088,289 | B2 * | 1/2012 | Tribelsky | 210/748.11 |
| 2002/0118253 | A1 * | 8/2002 | Ohno et al. | 347/47 |
| 2004/0012684 | A1 * | 1/2004 | Tinnerino | 348/208.1 |
| 2004/0129684 | A1 | 7/2004 | Sawaki et al. | |
| 2007/0021890 | A1 * | 1/2007 | Ide | 701/44 |
| 2007/0021891 | A1 * | 1/2007 | Fleet | 701/45 |
| 2007/0212890 | A1 | 9/2007 | Sakai et al. | |
| 2007/0212891 | A1 | 9/2007 | Yamamuro et al. | |

\* cited by examiner

METHOD OF MANUFACTURING LIQUID DISCHARGE HEAD SUBSTRATE AND METHOD OF PROCESSING THE SUBSTRATE

TECHNICAL FIELD

The present invention relates to a method of manufacturing a liquid discharge head substrate. More particularly, the present invention relates to a method of manufacturing a recording head substrate used for an inkjet recording head. In addition, the present invention relates to a method of processing the substrate.

BACKGROUND ART

A type of recording head that is called a side-shooter type head is available as an inkjet recording head (hereunder may be referred to as the "recording head") that discharges ink onto a recording medium. The side-shooter type head discharges ink towards an upper side of a heater serving as an energy generating unit that generates energy used in discharging the ink. The basic structure of a recording head substrate of the side-shooter type head is shown in FIGS. 2A and 2B. In the recording head substrate shown in FIGS. 2A and 2B, an ink supply port 13 is provided in a silicon substrate 12 having heaters 11 formed at its surface. The ink supply port 13 is a through hole extending through the silicon substrate 12. Ink is supplied from a back-surface side of the silicon substrate 12 to a front-surface side of the silicon substrate 12 through the ink supply port 13.

A method of manufacturing the recording head substrate having the above-described structure is disclosed in U.S. Pat. No. 6,143,190. U.S. Pat. No. 6,143,190 discloses the manufacturing method including the following steps for preventing variations in an opening diameter of the ink supply port serving as a through hole.

The steps are:
(a) forming a sacrifice layer, which can be selectively etched with respect to a substrate material, at an ink supply port formation portion at the surface of the silicon substrate,
(b) forming an etching-resistant passivation layer at the silicon substrate so as to cover the sacrifice layer,
(c) forming an etching mask layer, having an opening provided in correspondence with the sacrifice layer, at the back surface of the silicon substrate,
(d) etching the silicon substrate by crystal-axis anisotropic etching until the sacrifice layer is exposed from the opening of the etching mask layer,
(e) etching the sacrifice layer from a portion where it is exposed by the etching step of the silicon substrate so as to remove it, and
(f) forming an ink supply port by removing a portion of the passivation layer.

The silicon-crystal-axis anisotropic etching used in the aforementioned step (d) is known as a technology that makes it possible to precisely form the ink supply port.

U.S. Pat. No. 6,805,432 discloses a manufacturing method in which, after performing dry etching using an etching mask layer provided at a back surface of a silicon substrate, crystal-axis anisotropic etching is performed using the same etching mask. According to this manufacturing method, a processing section that is L-shaped is formed. In this manufacturing method, the etching mask layer is used in common in both the dry etching and the wet etching. Therefore, an opening width (mask width) of the etching mask layer formed at the back surface of the silicon substrate and an excavation amount of dry etching determine an opening width of the ink supply port formed in the back surface of the silicon substrate. Here, the term "opening width" of the ink supply port refers to a short-side direction width of the ink supply port. The term "opening length" of the ink supply port refers to a long-side direction width of the ink supply port.

For achieving high-speed recording of a high-definition image, discharge openings are disposed very close together, and a larger number of discharge openings are disposed by making discharge opening rows longer. However, when the discharge opening rows are made longer, it is necessary to increase the opening length of the ink supply port. This may reduce mechanical strength of the substrate. The reduction in the mechanical strength causes deformation or breakage of the substrate in the process of manufacturing a recording head. It is known that, in particular, this causes an orifice plate to be peeled by the deformation of the substrate, and breakage when a chip is mounted.

DISCLOSURE OF INVENTION

An embodiment of the present invention provides a method of manufacturing a liquid discharge head substrate including a substrate, which has atone surface thereof an energy generating element that generates energy used for discharging liquid, and a liquid supply port, which extends through the one surface of the substrate and through a back surface at a back side of the one surface. The method comprises the steps of providing the substrate having the energy generating element formed at the one surface; forming a recessed portion at the back surface by discharging liquid in a linear form to the back surface and by processing the back surface with laser light that has passed along and in the liquid; and forming the supply port by etching the substrate from the back surface in which the recessed portion is formed.

ADVANTAGEOUS EFFECTS OF INVENTION

According to the embodiment of the present invention, it is possible to form a liquid supply port having satisfactory supply characteristics while preventing a reduction in the mechanical strength of the substrate.

DESCRIPTION OF EMBODIMENTS

A method of manufacturing a liquid discharge head substrate according to an embodiment of the present invention will hereunder be described in detail with reference to the drawings.

A recording head substrate serving as an exemplary liquid discharge head substrate will hereunder be described.

Figure 3:
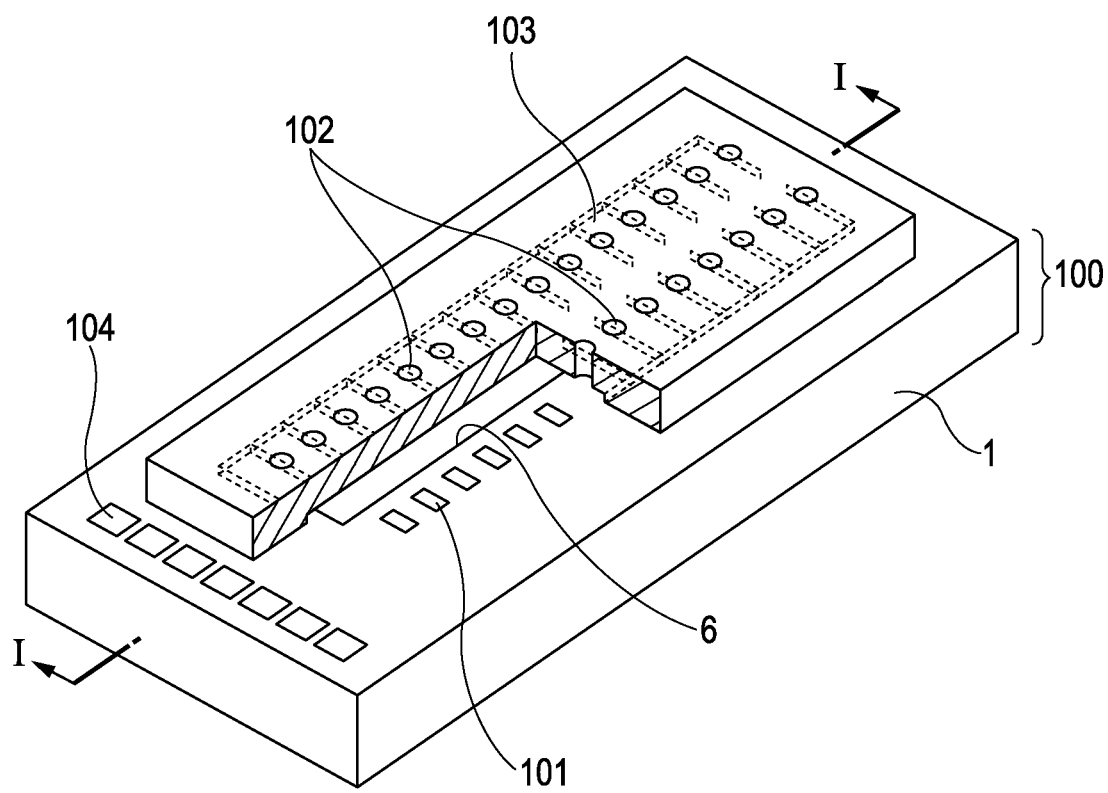
FIG. 3 is a schematic perspective view of an exemplary recording head related to the present invention.

FIG. 3 shows a recording head using the recording head substrate according to the embodiment. A recording head substrate 100 includes a substrate 1 provided with elements 101 serving as energy generating units, such as heaters, used for discharging liquid, such as ink, used in a recording operation. In addition, a supply port 6, serving as a through hole for supplying the liquid to the energy generating elements 101, is formed in the substrate 1. Further, terminals 104 for electrical connection with an external portion are provided on the substrate 1. Still further, discharge opening members 103, provided with discharge openings 102 for discharging the liquid, are provided on the recording head substrate 100.

The method of manufacturing the recording head substrate according to the embodiment is a method of manufacturing the recording head substrate used in an inkjet recording head. A feature of this method is the step of forming a through hole, serving as an ink supply port, in a silicon substrate. More specifically, the feature of the method is that, when forming a non-perforating hole that has not reached a surface opposite to a back surface in a back-surface side of the silicon substrate, a high-pressure liquid is ejected in a columnar form towards the silicon substrate, and the silicon substrate is irradiated with a laser beam that has passed in and along the columnar or linear liquid. More specifically, the method includes the step of forming a mask layer on the back surface of the silicon substrate, the step of forming openings in the mask layer, the step of forming a plurality of non-perforating holes in the silicon substrate, and the step of forming the non-perforating holes so that they extend to the front surface of the silicon substrate and so that the non-perforating holes that are adjacent to each other communicate with each other. These steps will hereunder be described in detail with reference to FIGS. 1A to 1D. FIGS. 1A to 1D are sectional views taken along line I-I of FIG. 3.

Although not shown, electrothermal transducers (TaN) of heaters serving as energy generating units for generating energy used to discharge ink are disposed at the front surface of the silicon substrate 1 whose front-and-back crystal plane orientation is (100). In addition, as shown in FIG. 1A, an etching-resistant passivation layer 2, serving a protective layer for the electrothermal transducers, is formed on the front surface of the silicon substrate 1.

Control signal input electrodes (not shown) for driving the electrothermal transducers are electrically connected to the electrothermal transducers. The thickness of the silicon substrate 1 is approximately 625 micrometers. Although, in the embodiment, the single silicon substrate 1 is processed, a wafer may be similarly processed.

Figure 1A:
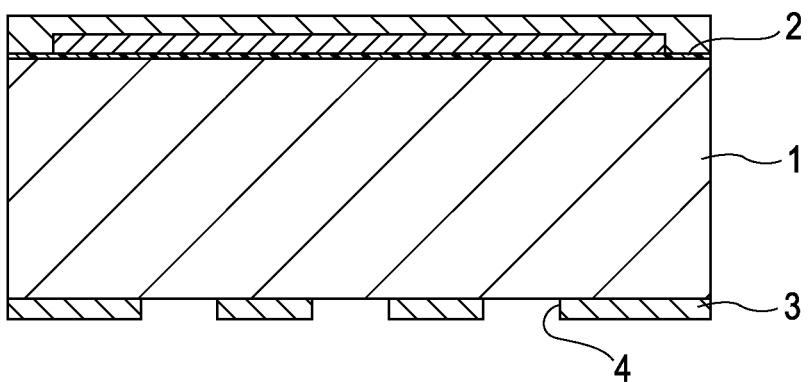
FIGS. 1A to 1D are schematic sectional views illustrating a method of manufacturing a recording head substrate according to an embodiment of the present invention.

As shown in FIG. 1A, after forming the metallic layer (mask layer) 3 on the back surface of the silicon substrate 1, a plurality of openings 4 are formed in the mask layer 3. The mask layer 3 is formed of a metal that does not absorb laser light used in a post-processing operation or that has very low absorptivity, such as An, Au, Ag, or Cu. In the embodiment, since a YAG laser is used in the post-processing operation, the mask layer 3 is formed of Au.

Figure 1B:
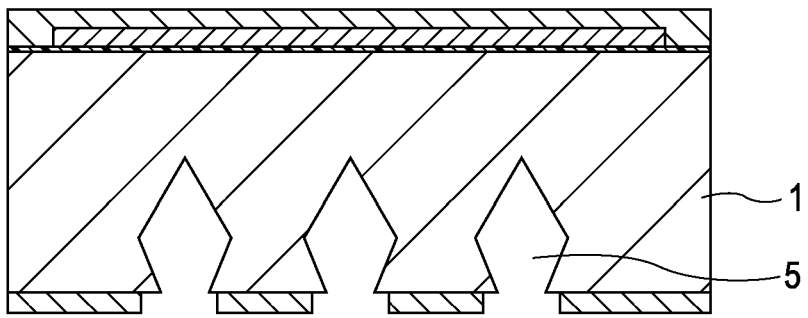

As shown in FIG. 1B, a plurality of non-perforating holes 5 are formed so as to extend from the back-surface side to the front-surface side of the silicon substrate 1 in the (100) plane by using a water-jet guide type laser (laser microjet) technology. Here, the laser microjet technology features irradiating a processing object with laser light, guided by a columnar water jet having a diameter that is less than or equal to 100 micrometers, instead of directly focusing the laser light to the processing object as in ordinary laser processing.

In the laser microjet technology, an optical system is built in so that a total reflection condition for the laser light is established at an interface between the water jet flow and air. This makes it possible to efficiently cool the processing object by the ceaselessly flowing water jet, and to prevent heat from influencing the processing object.

Here, the silicon substrate can be relatively quickly processed even by ordinary laser processing. When an ink flow path formation member is provided at the surface of the silicon substrate, the heat generated during the processing may cause the ink flow path formation member, formed of covering photosensitive resin, to be, for example, deformed. Accordingly, it may be difficult to form relatively deep holes. When non-perforating holes that do not extend through the front surface of the silicon substrate from the back surface of the silicon substrate are formed by ordinary laser processing, debris produced in the interior of the non-perforating holes during the processing makes it difficult to stably form relatively deep non-perforating holes. That is, variations tend to occur in the depths of the non-perforating holes formed in the silicon substrate. This problem can be solved when processing the silicon substrate using the laser microjet technology.

Figure 1C:
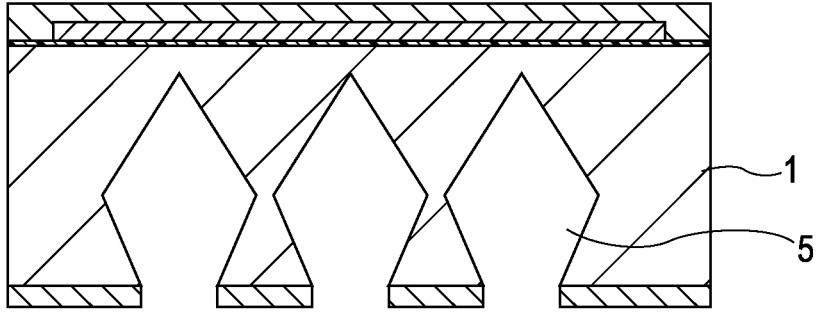

The description of the embodiment will now be resumed. As shown in FIGS. 1B and 1C, in the embodiment, the non-perforating holes 5, serving as recessed portions that do not extend through the front surface of the silicon substrate 1, are formed at the back-surface side using laser light having a wavelength (532 nm) of a second harmonic wave light emitted from the YAG laser. The wavelength of the YAG laser that is used is not limited to the second harmonic wave (having a wavelength of 532 nm), so that a fundamental wave (having a wavelength of 1064 nm) or a third harmonic wave (having a wavelength of 355 nm) may also be used. In any case, it is obvious that the frequency and output of the laser light are set to proper values. FIG. 1B shows the non-perforating holes 5 in the process of being formed, and FIG. 1C shows the non-perforating holes 5 that have been formed.

In the embodiment, the diameter of each non-perforating hole 5 that has been formed is approximately 100 micrometers, and its depth is approximately 500 micrometers to 600 micrometers. The depth of each non-perforating hole 5 refers to the distance from the back surface of the silicon substrate 1 to an end of each non-perforating hole 5.

Here, from the viewpoint of the water jet diameter, it is desirable that the diameter of each non-perforating hole 5 be approximately 30 micrometers to 100 micrometers. When the diameter of each non-perforating hole 5 is too small, etching liquid does not easily flow forwardly into each non-perforating hole 5 during anisotropic etching that is performed in the post-processing operation. This is not desirable. In contrast, when the diameter of each non-perforating hole 5 is too large, it takes a relatively long time to form the non-perforating holes 5 having predetermined depths. This is not desirable either.

When the non-perforating holes 5 are being formed, since the same location of the silicon substrate 1 is irradiated with laser light a plurality of times, the laser light is irregularly reflected in the interior of the silicon substrate 1 due to the influence of water that flows back. As a result, the non-perforating holes 5 widen in a lateral direction. More specifically, as shown in FIG. 1C, an area (a first inclined area) that is inclined so that an opening size of each non-perforating hole 5 is gradually increased from the back-surface side to the front-surface side of the silicon substrate 1, and a second inclined area that is inclined in a direction opposite to that of the first inclined area are formed in an inner surface of each non-perforating hole 5. In the embodiment, the inclination angle of each first inclined area with respect to the bottom surface of the silicon substrate 1 is greater than or equal to 54.7 degrees. In other words, the opening size of each non-perforating hole 5 (an area of a cross section parallel to the front surface or the back surface of the substrate) increases gradually from the back-surface side to the front-surface side of the silicon substrate 1 and, then, decreases gradually in the same direction. That is, the opening size of each non-perforating hole 5 is a maximum between the front and back surfaces of the silicon substrate 1 and in a plane parallel to the front and back surfaces. In sum, the cross section of each non-penetrating hole 5 that is perpendicular to the front and back surfaces of the silicon substrate 1 has a rhombic shape. An arrowhead shape in which a back-surface side and a front-surface side are different from each other is allowed. The widening of each non-penetrating hole 5 in the lateral direction (that is, in a direction parallel to the front and back surfaces of the silicon substrate 1) is determined by water pressure, laser output, and laser frequency. For example, it is known that, when the water pressure is 6 MPa, the laser output is 24.7 W, and the oscillation frequency is 90 kHz, the lateral widening is approximately 20 percent with respect to the depth. That is, the width resulting from the processing of the silicon substrate 1 is approximately 20 percent of the depth resulting from the processing.

The plurality of non-penetrating holes 5 are formed in a row at a pitch distance of 240 micrometers along the longitudinal direction of the silicon substrate 1. When the non-penetrating holes 5 that are adjacent to each other when they are formed communicate with each other, the flow of a water jet becomes indeterminate, as a result of which a predetermined shape cannot be obtained. Therefore, it is desirable to set the pitch distance so that the non-penetrating holes 5 that are adjacent to each other do not communicate with each other.

By forming the mask layer 3 using a metal that does not absorb laser light from the YAG laser that is used or having very low absorptivity, it is possible to restrict the widening of each opening 4 resulting from the laser light being reflected from the water that is flowing back.

Figure 4A:
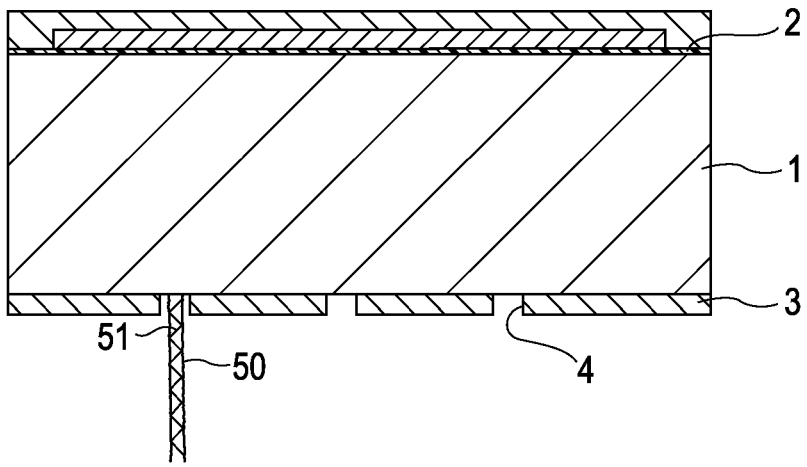
FIGS. 4A to 4C are schematic sectional views illustrating a method of manufacturing a recording head substrate according to the embodiment of the present invention.
Figure 4B:
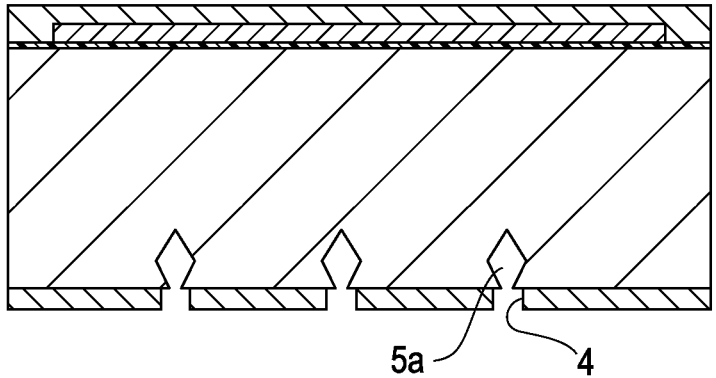
Figure 4C:
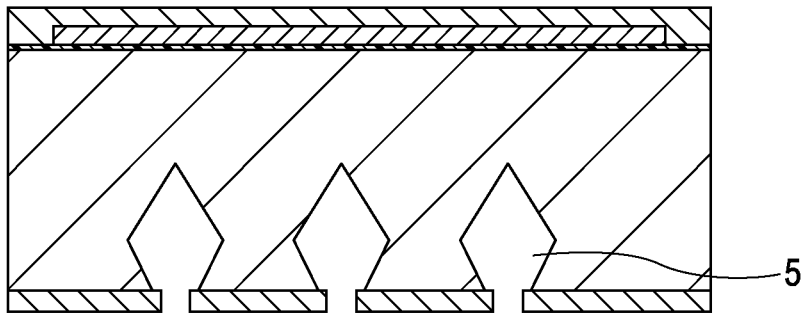

This will be described in more detail with reference to FIGS. 4A to 4C. FIGS. 4A to 4C are sectional views as with FIGS. 1A to 1D.

As shown in FIG. 4A, the back surface of the substrate 3 provided with the mask layer 3 formed of Au is irradiated with laser light 51 emitted from a YAG laser and passing in and along a columnar or linear liquid 50. This causes small holes 5a to be formed as shown in FIG. 4B. At this time, water exists in the small holes 5a, and the laser light is being irregularly reflected. When the mask layer 3 is irradiated with the irregularly reflected laser light, the openings 4 become large, thereby increasing the possibility of the water flowing to the outside. In the embodiment, since the Au mask layer 3 does not easily absorb the laser light from the YAG laser, the diameters of the openings 4 are maintained. As a result, the water remains in the small holes 5a, thereby increasing irregular reflection. Then, by irradiating the interior of each small hole 5a with a laser water jet, the processing is accelerated, thereby efficiently enlarging the small holes 5a and forming recessed portions 5 as shown in FIG. 4C. By repeating the aforementioned operations and accelerating the processing, it is possible for the recessed portions 5 to reach the front surface and to be formed as supply ports.

Figure 1D:
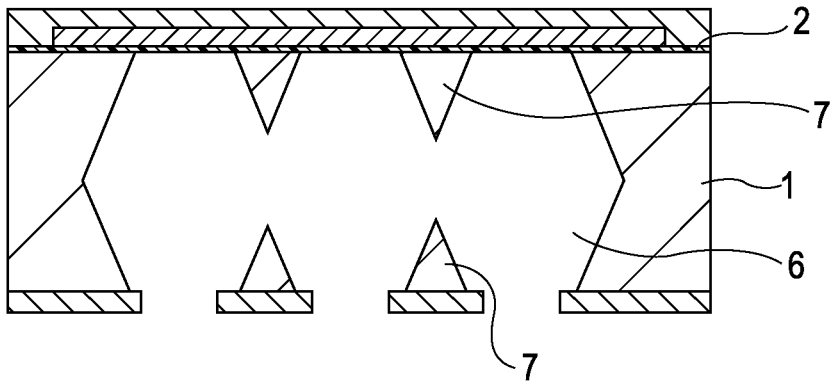
Figure 2A:
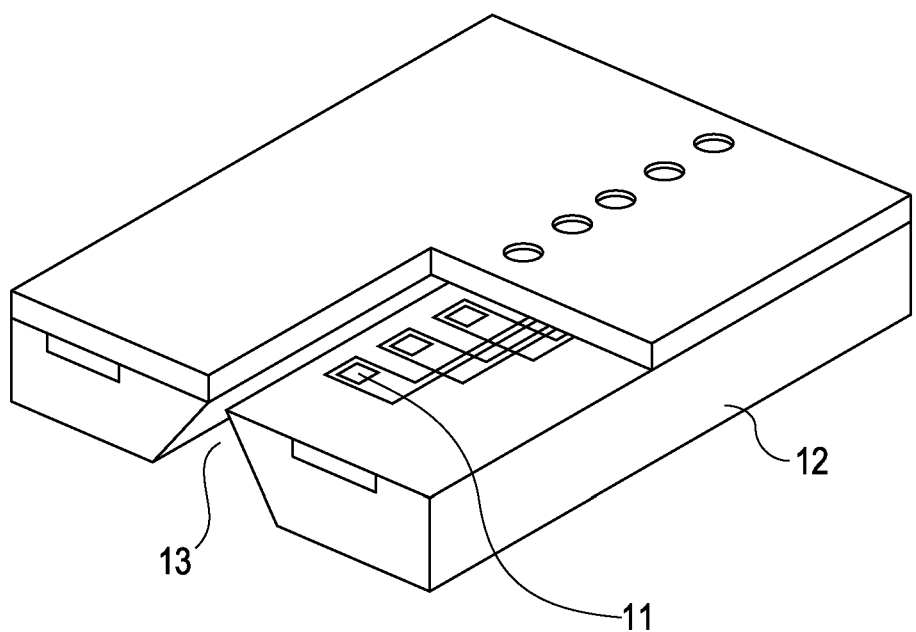
FIGS. 2A and 2B are schematic perspective views of an exemplary structure of the recording head substrate.
Figure 2B:
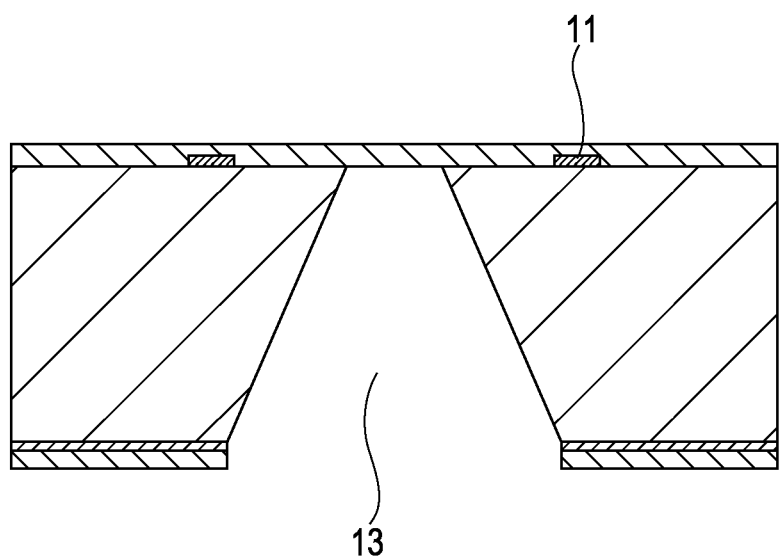

Next, the silicon substrate 1 is immersed in an alkali water solution to perform wet etching (crystal anisotropic wet etching). More specifically, as shown in FIG. 1D, the non-penetrating holes 5 are made to extend to the front surface of the silicon substrate 1, and the non-penetrating holes 5 that are adjacent to each other are made to communicate with each other to form one through hole 6. The alkali water solution used for the etching may be, for example, TMAH or KOH.

The etching is started from all of inner wall surfaces of the non-penetrating holes 5. Then, in some portions, the etching proceeds while forming a (111) surface where an etching rate is low. In other portions, the etching proceeds along a (001) plane or a (011) surface where the etching rate is high. (111) planes are formed from ends of the non-penetrating holes 5.

Thereafter, a portion of a passivation layer 2, formed in correspondence with open portions of the through hole 6 at the surface of the silicon substrate 1, is removed by dry etching. This causes the through hole 6 to open even at the front-surface side of the silicon substrate 1, and to become an ink supply port.

According to this manufacturing method, since beams 7 are formed at the back-surface side and the front-surface side of the substrate in the ink supply port 6, it is possible to prevent a reduction in the mechanical strength of the substrate, so that it is possible prevent peeling of an orifice plate caused by the deformation of the substrate, and breakage when a chip is mounted.

It is possible to reduce the opening size of the ink supply port 6 at the back surface of the silicon substrate 1, and to efficiently form the ink supply opening 6. Therefore, it is possible to increase processing speed of the ink supply port 6, and to reduce manufacturing costs of the recording head substrate and, thus, the recording head.

In the step of forming the non-penetrating holes 5 so that they extend to the front surface of the silicon substrate 1 and so that the non-perforating holes 5 that are adjacent to each other communicate with each other to form one through hole 6, isotropic etching can be used. For example, dry etching using a reactive gas including, for example, any one of a carbon atom, a chlorine atom, a sulfur atom, a fluorine atom, an oxygen atom, a hydrogen atom, and a argon atom, using a reactive gas including a molecule including any of these atoms may be carried out.

The embodiment of the present invention described above is applicable to forming a through hole in, for example, a semiconductor substrate, in addition to a liquid discharge head substrate. It is applicable to, for example, micromachining an acceleration sensor.

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-160306, filed Jun. 19, 2008, which is hereby incorporated by reference herein in its entirety.

The invention claimed is:

1. A method of manufacturing a liquid discharge head substrate including a substrate, which has a front surface and a back surface opposite the front surface and which has on the front surface an energy generating element that generates energy used for discharging liquid, and a liquid supply port, which extends through the front and back surfaces of the substrate, the method comprising the steps of:
   providing a recessed portion in the back surface of the substrate by discharging a manufacturing liquid in a linear trajectory to the back surface of the substrate and by irradiating the back surface with laser light that passes along and in the manufacturing liquid; and
   forming the liquid supply port by etching the substrate from the recessed portion on the back surface.

2. The method according to claim 1, wherein the back surface of the substrate is provided with a metallic layer having an opening, and the back surface of the substrate is irradiated with the laser light through an interior of the opening.

3. The method according to claim 1, wherein the etching is wet etching.

4. The method according to claim 1, wherein the laser light is pulse laser light, and the back surface is irradiated with the laser light a plurality of times.

5. The method according to claim 1, wherein a crystal plane orientation of the one surface is (100).

6. The method according to claim 2, wherein the metallic layer includes gold, and the laser light is light emitted from a YAG laser.

* * * * *